(12) United States Patent
Gopalakrishnan et al.

(10) Patent No.: US 10,460,192 B2
(45) Date of Patent: Oct. 29, 2019

(54) METHOD AND SYSTEM FOR OPTICAL CHARACTER RECOGNITION (OCR) OF MULTI-LANGUAGE CONTENT

(71) Applicant: XEROX CORPORATION, Norwalk, CT (US)

(72) Inventors: Sainarayanan Gopalakrishnan, Chennai (IN); Rajasekar Kanagasabai, Chennai (IN); Sudhagar Subbaian, Coimbatore (IN)

(73) Assignee: XEROX Corporation, Norwalk, CT (US)

( * ) Notice: Subject to any disclaimer, the term of this patent is extended or adjusted under 35 U.S.C. 154(b) by 0 days.

(21) Appl. No.: 15/299,717

(22) Filed: Oct. 21, 2016

(65) Prior Publication Data
US 2018/0114085 A1 Apr. 26, 2018

(51) Int. Cl.
*G06K 9/34* (2006.01)
*G06K 9/00* (2006.01)
*H04N 1/04* (2006.01)

(52) U.S. Cl.
CPC ......... *G06K 9/344* (2013.01); *G06K 9/00463* (2013.01); *H04N 1/04* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,047,251 A * | 4/2000 | Pon | G06K 9/6807 382/229 |
| 6,397,213 B1 * | 5/2002 | Cullen | G06F 17/30017 |
| 2004/0006467 A1 * | 1/2004 | Anisimovich | G06K 9/6842 704/251 |
| 2010/0202691 A1 * | 8/2010 | Hamada | H04N 1/00326 382/181 |

OTHER PUBLICATIONS

Wikipedia—"Multi-Function Printer", available Nov. 2015.*

* cited by examiner

*Primary Examiner* — Mark Roz
(74) *Attorney, Agent, or Firm* — Jones Robb, PLLC

(57) ABSTRACT

A method and system are provided for optical character recognition (OCR) of multi-language content. The method includes extracting a text portion from an image received from a user-computing device. The text portion comprises a plurality of keywords associated with a plurality of languages. The method further includes segmenting the plurality of keywords into a plurality of layers. Each layer of the plurality of layers comprises one or more keywords which are associated with a language. The method further comprise generating an OCR output of each of the plurality of layers based on the language associated with the one or more keywords in each of the plurality of layers. The method further comprises generating an electronic document of the received image based on the generated OCR output of each of the plurality of layers. The method further includes transmitting the generated electronic document to the user-computing device.

18 Claims, 6 Drawing Sheets

METHOD AND SYSTEM FOR OPTICAL CHARACTER RECOGNITION (OCR) OF MULTI-LANGUAGE CONTENT

TECHNICAL FIELD

The presently disclosed embodiments are related, in general, to optical character recognition (OCR) of content. More particularly, the presently disclosed embodiments are related to a method and system for the OCR of multi-language content.

BACKGROUND

In the modern era of digitization, OCR has emerged as a convenient solution for converting various images, such as scanned documents and photos of documents, into electronic documents. Typically, OCR engines are trained for recognizing specific languages. These engines use the trained features of a selected language for recognizing text.

In certain scenarios, images may comprise multi-lingual text content. In such scenarios, the OCR engines take more time for processing and generating the electronic documents with reduced accuracy. For example, an OCR engine, trained in English, may be utilized to generate an electronic document from a scanned document, which comprises multi-lingual text content such as English and Russian. In this example, the OCR engine may recognize English text content with a higher accuracy compared with Russian text content in the scanned document. One solution to such a problem is to use different OCR engines trained for different languages for a single multi-lingual document. In another solution, an individual, such as a subject matter expert, may manually go through each paragraph of the multi-lingual document, and then may translate the document. However, such solutions may be unrealistic and impractical when thousands of multi-lingual documents are to be processed. Therefore, an automatic and robust OCR processing technique for images with more than one language is required.

Further limitations and disadvantages of conventional and traditional approaches will become apparent to those skilled in the art, through a comparison of described system with some aspects of the present disclosure, as set forth in the remainder of the present application and with reference to the drawings.

SUMMARY

According to embodiments illustrated herein, there may be provided a method for OCR of multi-language content. The method may comprise extracting, by a data processor, at least a text portion from an image received from a user-computing device associated with a user over a communication network. In an embodiment, the text portion comprises a plurality of keywords associated with a plurality of languages. The method may further comprise, segmenting, by a data segmentation processor, the plurality of keywords into a plurality of layers. In an embodiment, each layer of the plurality of layers comprises one or more keywords, from the plurality of keywords, which are associated with a language from the plurality of languages. The method may further comprise generating, by a multi-language processor, an OCR output of each of the plurality of layers based on the language associated with the one or more keywords in each of the plurality of layers. The method may further comprises generating by a document generating processor, an electronic document of the received image based on the generated OCR output of each of the plurality of layers. In an embodiment, the generated electronic document is transmitted to the user-computing device, over the communication network.

According to embodiments illustrated herein, there may be provided a system for OCR of multi-language content. The system may comprise a data processor configured to extract at least a text portion from an image received from a user-computing device associated with a user, over a communication network. In an embodiment, the text portion comprises a plurality of keywords associated with a plurality of languages. The system may further comprise a data segmentation processor configured to segment the plurality of keywords into a plurality of layers. In an embodiment, each layer of the plurality of layers comprises one or more keywords, from the plurality of keywords, which are associated with a language from the plurality of languages. The system may further comprise a multi-language OCR processor configured to generate an OCR output of each of the plurality of layers based on the language associated with the one or more keywords in each of the plurality of layers. The system may further comprise a document generating processor configured to generate an electronic document of the received image based on the generated OCR output of each of the plurality of layers. In an embodiment, the generated electronic document is transmitted to the user-computing device, over the communication network.

According to embodiments illustrated herein, there is provided a computer program product for use with a computer, the computer program product comprising a non-transitory computer readable medium, wherein the non-transitory computer readable medium stores a computer program code for OCR of multi-language content. The computer program code is executable by one or more processors to extract at least a text portion from an image received from a user-computing device associated with a user, over a communication network. Further, the text portion comprises a plurality of keywords associated with a plurality of languages. The computer program code is further executable by one or more processors to segment the plurality of keywords into a plurality of layers. Further, each layer of the plurality of layers comprises one or more keywords, from the plurality of keywords, which are associated with a language from the plurality of languages. The computer program code is further executable by one or more processors to generate an OCR output of each of the plurality of layers based on the language associated with the one or more keywords in each of the plurality of layers. The computer program code is further executable by one or more processors to generate an electronic document of the received image based on the generated OCR output of each of the plurality of layers. Further, the generated electronic document is transmitted to the user-computing device, over the communication network.

BRIEF DESCRIPTION OF DRAWINGS

The accompanying drawings illustrate the various embodiments of a system, method, and other aspects of the disclosure. Any person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not limit the scope in any manner, wherein similar designations denote similar elements, and in which.

DETAILED DESCRIPTION

Figure 1:
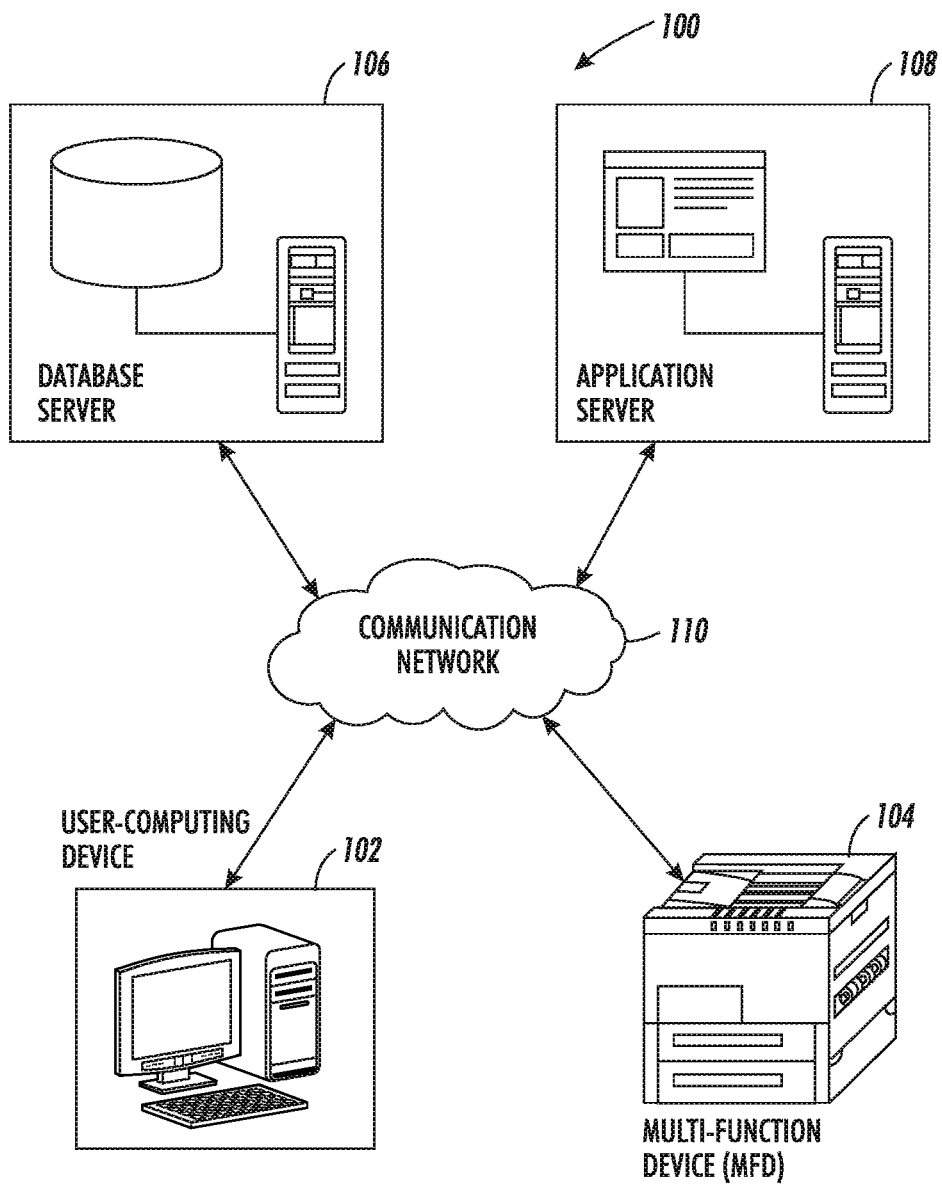
FIG. 1 is a block diagram that illustrates a system environment in which various embodiments of a method and a system may be implemented, in accordance with at least one embodiment.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes, as the method and system may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "computing device" refers to a computer, a device (that includes one or more processors/microcontrollers and/or any other electronic components), or a system (that performs one or more operations according to one or more sets of programming instructions, codes, or algorithms) associated with an individual. In an embodiment, the individual may utilize the computing device to transmit one or more images to a computing server. Examples of the computing device may include, but are not limited to, a desktop computer, a laptop, a personal digital assistant (PDA), a mobile device, a smartphone, and a tablet computer (e.g., iPad® and Samsung Galaxy Tab®).

"Optical character recognition (OCR)" refers to the conversion of text content (handwritten, typewritten, or printed) in an image, such as a scanned document or an image of a document, into machine-encoded text for generating an electronic document of the image. In an embodiment, the electronic document generated after performing the OCR on the image can be edited electronically.

"Multi-language content" refers to a document that comprises text content corresponding to multiple languages, such as English, Hindi, Urdu, Arabic, Japanese, and/or the like, in an image format. In an embodiment, the multi-language content may be reproduced on a computing device through an application such as Windows Media Player®, Adobe® Flash Player, Apple® QuickTime®, and/or the like. In an embodiment, the multi-language content may be downloaded from a server to the computing device. In an alternate embodiment, the multi-language content may be retrieved from a media storage device, such as a hard disk drive (HDD), CD drive, pen drive, and/or the like, connected to (or inbuilt within) the computing device. In an embodiment, the multi-language content may correspond to an image that comprises text content of the multiple languages.

An "image" refers to an artifact depicting visual perception, such as a two-dimensional picture, which has similar appearance to some physical subject or object such as a hard copy of a document. Such visual perception may correspond to information that may be recorded, displayed, interpreted, and/or processed by a computing device. In an embodiment, the image includes one or more of text content (handwritten or typed), symbols, and so forth. In an embodiment, the image is obtained by scanning a hard copy of a document using a suitable scanner or a multi-function device. In an embodiment, the scanned document is a digital image. The digital image refers to a collection of data, including image data in any format, retained in an electronic form. The digital image can contain, but not limited to, one or more pictorial representations, symbols, text, line art, blank, and/or non-printed regions. The digital image can be stored in various file formats such as JPG or JPEG, GIF, TIFF, PNG, BMP, RAW, PSD, PSP, PDF, and the like. Hereinafter, the terms, "image," "digital image," "scanned image," "captured image," and "multi-language content" are interchangeably used without departing from the scope of the ongoing description.

A "keyword" refers to a meaningful element of text content that comprises a space on either side. In an embodiment, a plurality of keywords written or printed in a document constitute the text content of the document. Further, different keywords in the plurality of keywords are associated with different languages.

A "layer" refers to an isolated virtual layer that may comprise one or more keywords from a plurality of keywords corresponding to same language. In an embodiment, the plurality of keywords may be segmented into a plurality of layers based on the association of each keyword with a language. For example, an image comprises "25 keywords" such that "15 keywords" are in English language and "10 keywords" are in Russian language. Thus, the "25 keywords" are segmented into "2 layers" (i.e., a first layer and a second layer). The first layer may comprise "15 keywords" that are in English language and the second layer may comprise "10 keywords" that are in Russian language.

A "text portion" refers to a portion in an image that comprises text content. In an embodiment, the text portion may comprise multi-language content. Further, in an embodiment, the text portion may correspond to a foreground portion of the image. The text portion may be superimposed on a background portion of the image.

A "sub-portion" of a text portion comprises one or more keywords associated with the same language. In an embodiment, the text portion may comprise a plurality of sub-portions. In an embodiment, the plurality of sub-portions may be identified based on one or more pre-defined rules specified by a user. In an embodiment, each of the plurality of sub-portions may be associated with one or more position identifiers as defined by the user in the one or more pre-defined rules. Hereinafter, terms such as "sub-portion of a text portion" or "textual sub-portion" may be used interchangeably without deviating from the scope of the disclosure.

An "electronic document" refers to information recorded in a manner that requires a computing device or any other electronic device to display, interpret, and process it. In an embodiment, the electronic document includes OCR text of an image. In an embodiment, the electronic document may comprise text content (i.e., OCR text), which can be edited electronically.

A "multi-function device" (MFD) refers to a device that can perform multiple functions. Examples of the functions include, but are not limited to, scanning, printing, copying, faxing, emailing, and the like. In an embodiment, the MFD includes a scanner and a printer for scanning the images to generate OCR. In an embodiment, the MFD has communication capabilities that enable the MFD to send/receive images to/from other electronic device(s), in accordance with one or more communication protocols, such as, but not limited to, file transfer protocol, e-mail, server message block protocol and network file system.

FIG. 1 is a block diagram that illustrates a system environment in which various embodiments of a method and a system may be implemented in accordance with at least one embodiment. With reference to FIG. 1, there is shown a system environment 100 that includes a user-computing device 102, an MFD 104, a database server 106, an application server 108, and a communication network 110. The user-computing device 102, the MFD 104, the database server 106, and the application server 108 may be communicatively coupled with each other over one or more communication networks, such as the communication network 110. For simplicity, FIG. 1 shows one user-computing device, such as the user-computing device 102, one MFD, such as the MFD 104, one database server, such as the database server 106, and one application server, such as the application server 108. However, it will be apparent to a person having ordinary skill in the art that the disclosed embodiments may also be implemented using multiple user-computing devices, multiple MFDs, multiple database servers, and multiple application servers without deviating from the scope of the disclosure.

The user-computing device 102 may refer to a computing device (associated with a user) that may be communicatively coupled to the communication network 110. In an embodiment, the user-computing device 102 may include one or more processors in communication with one or more memory units. Further, in an embodiment, the one or more processors may be operable to execute one or more sets of computer-readable code, instructions, programs, or algorithms, stored in the one or more memory units, to perform one or more operations specified by the user. In an embodiment, the user may utilize the user-computing device 102 to communicate with the MFD 104, the database server 106, and/or the application server 108 over the communication network 110. In an embodiment, the user may correspond to an individual who may utilize the user-computing device 102 to transmit a request and an image to the application server 108. In response to the request, the application server 108 may perform OCR on the image to generate an electronic document of the image, and transmit the generated electronic document to the user-computing device 102.

In an embodiment, the image may correspond to multi-language content. In an embodiment, the image may be stored in the one or more memory units of the user-computing device 102. In another embodiment, the user may receive the image from the MFD 104 or the database server 106. In an embodiment, the user may utilize the user-computing device 102 to define one or more rules for identifying a plurality of sub-portions from a text portion in the image along with the request. In an embodiment, the user may define the one or more rules by utilizing an interactive user interface received from the application server 108. Hereinafter, each sub-portion in the plurality of sub-portions of a text portion may be referred to as a textual sub-portion, without deviating from the scope of the disclosure.

In an embodiment, the user-computing device 102 may include hardware and/or software to display the electronic document to the user. In an embodiment, the user may further utilize the user-computing device 102 to perform the one or more operations, such as editing, selecting, and/or the like, on the text content in the displayed electronic document.

The user-computing device 102 may be implemented as a variety of computing devices such as a desktop, a computer server, a laptop, a PDA, a tablet computer, a mobile phone, a smartphone, and the like.

The MFD 104 corresponds to a computing device that may be configured to perform one or more pre-defined operations. Example of the one or more pre-defined operations may include, but are not limited to, scanning, copying, printing, emailing, and faxing. In an embodiment, the MFD 104 may include a scanner for scanning a hard copy of a plurality of images. In an embodiment, the MFD 104 may be configured to scan any object, such as the hard copy of the plurality of images, placed on a plate of the MFD 104 to generate a digital image for each of the plurality of images. Thereafter, the MFD 104 may be configured to transmit the digital image of each of the plurality of images to the database server 106 for storage. In another embodiment, the MFD 104 may be configured to transmit the digital image of each of the plurality of images to the user-computing device 102. Thus, in an embodiment, the MFD 104 may have communication capabilities that enable the MFD 104 to transmit/receive data and messages in accordance with one or more communication protocols such as, but are not limited to, FTP, WebDAV, email, SMB, NFS, and TWAIN, over the communication network 110. Examples of the MFD 104 may include, but are not limited to, a multi-functional printer and/or a multi-functional peripheral.

The database server 106 may refer to a computing device or a storage device that may be communicatively coupled to the communication network 110. In an embodiment, the database server 106 may be configured to perform one or more database operations. Examples of the one or more database operations may include receiving/transmitting one or more queries, requests, or the multi-language content (i.e., the images) from/to one or more computing devices, such as the user-computing device 102, the MFD 104, and/or the application server 108. The one or more database operations may further include processing and storing the one or more queries, requests, or the multi-language content.

In an embodiment, the database server 106 may be configured to store a plurality of images. Further, the database server 106 may be configured to store one or more pre-defined templates. In an embodiment, a pre-defined template in the one or more pre-defined templates may comprise a fixed structure/orientation of text content. For example, a pre-defined template may correspond to a recruitment form, an application form, and/or the like. In an embodiment, a pre-defined template may be associated with a plurality of languages, such that the text content associated with a language is contained in a pre-defined region, i.e., a textual sub-portion. For example, in a pre-defined template "50 percent" of the text content is associated with English language and the remaining "50 percent" of the text content is associated with Russian language. The text content associated with English language is contained in first half of the pre-defined template and the text content associated with Russian language is contained in remaining half of the pre-defined template. In an embodiment, the database server 106 may be configured to store the one or more pre-defined rules specified by the user for each of the one or more pre-defined templates. In an embodiment, the one or more pre-defined rules may comprise a definition of the plurality of textual sub-portions in the pre-defined template. The definition of a textual sub-portion may comprise details pertaining to an association of the corresponding textual sub-portion with a language and one or more position identifiers of the textual sub-portion. For example, the one or more pre-defined rules for a pre-defined template "T1" may comprise a definition of a first textual sub-portion and a second textual sub-portion. The definition of the first textual sub-portion may comprise details pertaining to an association of the first textual sub-portion with English language and the one or more position identifiers of a bounding box encompassing the first textual sub-portion. Similarly, the definition of the second textual sub-portion may comprise details pertaining to an association of the second textual sub-portion with Russian language and the one or more position identifiers of a bounding box encompassing the second textual sub-portion.

In an embodiment, the database server 106 may be further configured to store the generated electronic document. Thereafter, upon receiving a retrieval request, the database server 106 may transmit the generated electronic document to the user-computing device 102, over the communication network 110.

Further, in an embodiment, the database server 106 may be configured to store the one or more sets of instructions, code, scripts, or programs that may be retrieved by the application server 108 to perform the one or more operations. In an embodiment, the database server 106 may be configured to receive a query from the application server 108 to retrieve the image from the plurality of images based on the request of the user.

For querying the database server 106, one or more querying languages may be utilized, such as, but not limited to, SQL, QUEL, and DMX. In an embodiment, the database server 106 may be realized through various technologies such as, but not limited to, Microsoft® SQL Server, Oracle®, IBM DB2®, Microsoft Access®, PostgreSQL®, MySQL® and SQLite®, and/or the like.

The application server 108 may refer to a computing device or a software framework hosting an application or a software service that may be communicatively coupled to the communication network 110. In an embodiment, the application server 108 may be implemented to execute procedures, such as, but not limited to, one or more sets of programs, instructions, code, routines, or scripts stored in one or more memory units for supporting the hosted application or the software service. In an embodiment, the hosted application or the software service may be configured to perform the one or more operations of the application server 108. In an embodiment, the application server 108 may be configured to transmit the interactive user interface to the user-computing device 102.

In an embodiment, the application server 108 may be configured to transmit a query to the database server 106 to retrieve the image based on the request received from the user-computing device 102. After retrieving the image from the database server 106, the application server 108 may be configured to extract the text portion from the image. Further, the text portion comprises a plurality of keywords associated with a plurality of languages.

Prior to receiving the image from the user-computing device 102, the application server 108 may be configured to train an OCR processor to recognize the plurality of languages. Thereafter, the application server 108 may be configured to determine the language associated with each keyword in the plurality of keywords.

In another embodiment, the application server 108 may be configured to identify the plurality of textual sub-portions in the extracted text portion based on the association of each textual sub-portion in the plurality of textual sub-portions with a language from the plurality of languages. In an embodiment, the application server 108 may be configured to identify the plurality of textual sub-portions based on the pre-defined rules specified by the user. Thereafter, the application server 108 may be configured to segment the plurality of textual sub-portions in a plurality of layers based on the association of the plurality of textual sub-portions with the plurality of languages. Thus, each textual sub-portion in the plurality of textual sub-portions may correspond to a layer in the plurality of layers.

In another embodiment, the application server 108 may be configured to segment the plurality of keywords in the text portion into the plurality of layers. In an embodiment, the application server 108 may be configured to segment the plurality of keywords into the plurality of layers based on the association of the plurality of keywords with the plurality of languages. Thus, each layer in the plurality of layers may comprise one or more keywords that are associated with a same language in the plurality of languages. Further, in an embodiment, the application server 108 may be configured to generate an OCR output of each of the plurality of layers based on the language associated with the one or more keywords in each of the plurality of layers.

In an embodiment, the application server 108 may be configured to generate the electronic document of the received image based on the generated OCR output of each of the plurality of layers. The generation of the electronic document has been explained in detail later in conjunction with FIG. 3.

After generating the electronic document, the application server 108 may be configured to transmit the generated electronic document to the user-computing device 102. In another embodiment, the application server 108 may be configured to store the generated electronic document in the database server 106.

The application server 108 may be realized through various types of application servers, such as, but are not limited to, a Java application server, a .NET framework application server, a Base4 application server, a PHP framework application server, or any other application server framework.

A person having ordinary skill in the art will appreciate that the scope of the disclosure is not limited to realizing the application server 108 and the user-computing device 102 as separate entities. In an embodiment, the application server 108 may be realized as an application program installed on and/or running on the user-computing device 102 without departing from the scope of the disclosure.

The communication network 110 may include a medium through which devices, such as the user-computing device 102 and the MFD 104, and servers, such as the database server 106 and the application server 108, may communicate with each other. Examples of the communication network 110 may include, but are not limited to, the internet, a cloud network, a Wireless Fidelity (Wi-Fi) network, a wireless local area network (WLAN), a local area network (LAN), a wireless personal area network (WPAN), a wireless wide area network (WWAN), a cloud network, a long-term evolution (LTE) network, a plain old telephone service (POTS), and/or a metropolitan area network (MAN). Various devices in the system environment 100 may be configured to connect to the communication network 110, in accordance with various wired and wireless communication protocols. Examples of such wired and wireless communication protocols may include, but are not limited to, transmission control protocol and internet protocol (TCP/IP), user datagram protocol (UDP), hypertext transfer protocol (HTTP), file transfer protocol (FTP), ZigBee, EDGE, infrared (IR), IEEE 802.11, 802.16, cellular communication protocols, such as long term evolution (LTE), light fidelity (Li-Fi), and/or other cellular communication protocols or Bluetooth (BT) communication protocols.

Figure 2:
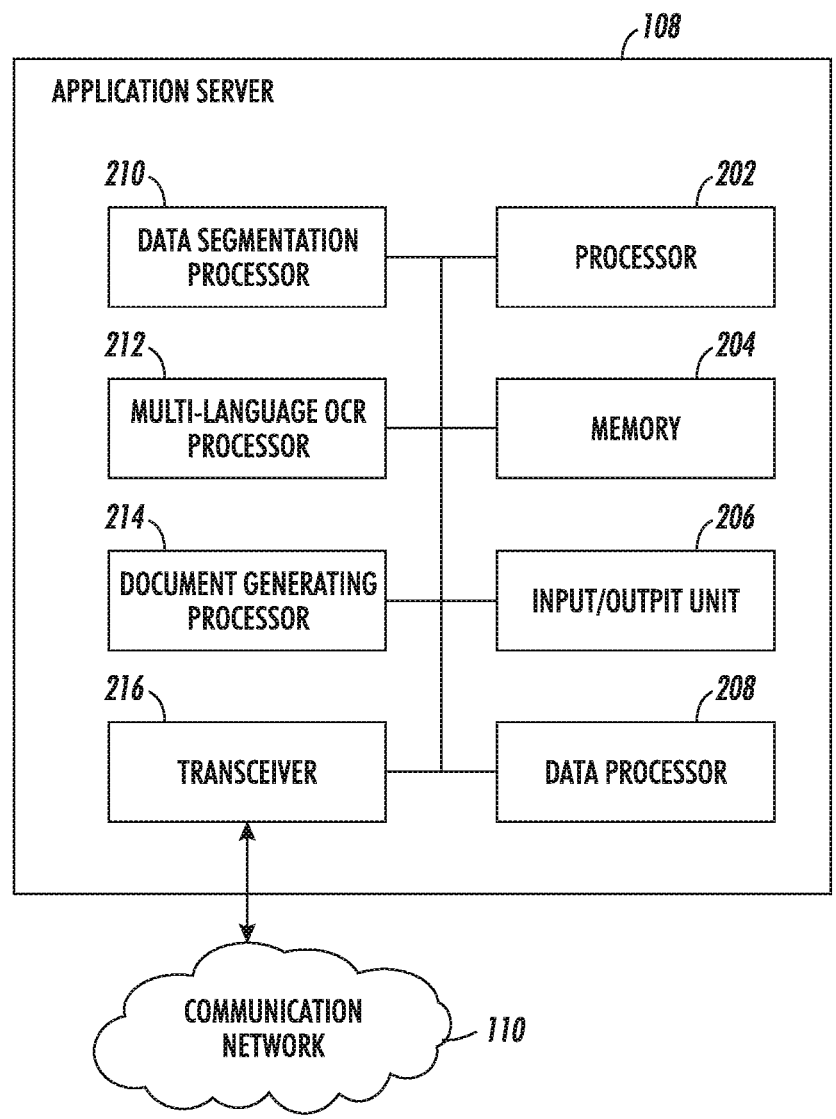
FIG. 2 is a block diagram that illustrates a system for OCR of multi-language content, in accordance with at least one embodiment.

FIG. 2 is a block diagram that illustrates a system for OCR of multi-language content, in accordance with at least one embodiment. With reference to FIG. 2, there is shown a system 200 that may include one or more processors, such as a processor 202, one or more memory units, such as a memory 204, one or more input/output (I/O) units, such as I/O unit 206, one or more data processors, such as a data processor 208, one or more data segmentation processors, such as a data segmentation processor 210, one or more multi-language OCR processors, such as a multi-language OCR processor 212, one or more document generating processors, such as a document generating processor 214, and one or more transceivers, such as a transceiver 216.

The system 200 may correspond to a computing device, such as the user-computing device 102, or a computing server, such as the application server 108, without departing from the scope of the disclosure. However, for the purpose of the ongoing description, the system 200 corresponds to the application server 108.

The processor 202 comprises a suitable logic, circuitry, interfaces, and/or a code that may be configured to execute a set of instructions, programs, or algorithms stored in the memory 204 to perform the one or more operations. For example, the processor 202 may be configured to process the multi-language content (i.e., the image) for OCR. In an embodiment, the processor 202 may be communicatively coupled to the memory 204, the I/O unit 206, the data processor 208, the data segmentation processor 210, the multi-language OCR processor 212, the document generating processor 214, and the transceiver 216. The processor 202 may be implemented based on a number of processor technologies known in the art. Examples of the processor 202 include, but not limited to, an X86-based processor, a reduced instruction set computing (RISC) processor, an application-specific integrated circuit (ASIC) processor, a complex instruction set computing (CISC) processor, and/or other processors.

The memory 204 may be operable to store one or more machine codes, and/or computer programs that have at least one code section executable by the processor 202, the I/O unit 206, the data processor 208, the data segmentation processor 210, the multi-language OCR processor 212, the document generating processor 214, and the transceiver 216. The memory 204 may store the one or more sets of instructions, programs, code, or algorithms that are executed by the processor 202, the I/O unit 206, the data processor 208, the data segmentation processor 210, the multi-language OCR processor 212, the document generating processor 214, and the transceiver 216 to perform the respective one or more operations. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes and/or computer programs that are executable by the processor 202, the I/O unit 206, the data processor 208, the data segmentation processor 210, the multi-language OCR processor 212, the document generating processor 214, and the transceiver 216 to perform the respective one or more operations. It will be apparent to a person having ordinary skill in the art that the one or more instructions stored in the memory 204 may enable the hardware of the system 200 to perform the one or more operations.

The I/O unit 206 comprises a suitable logic, circuitry, interfaces, and/or a code that may be operable to facilitate the user to input the one or more images. For example, the user may utilize the I/O unit 206 to input a plurality of images. The I/O unit 206 may be operable to communicate with the processor 202, the memory 204, the data processor 208, the data segmentation processor 210, the multi-language OCR processor 212, the document generating processor 214, and the transceiver 216. Further, in an embodiment, the transceiver 216, in conjunction with the processor 202 and the I/O unit 206, may be operable to transmit the electronic document of the image to the user-computing device 102 associated with the user. Examples of the input devices may include, but are not limited to, a keyboard, a mouse, a joystick, a touch screen, a microphone, a camera, and/or a docking station. Examples of the output devices may include, but are not limited to, a display screen and/or a speaker.

The data processor 208 comprises a suitable logic, circuitry, interfaces, and/or a code that may be configured to execute the one or more sets of instructions, programs, or algorithms stored in the memory 204 to perform the one or more operations. For example, the data processor 208 may be configured to extract at least text portion from the image received from the user-computing device 102 associated with the user. The extraction of the text portion from the image has been explained later in detail in FIG. 3. The data processor 208 may be communicatively coupled to the processor 202, the memory 204, the I/O unit 206, the data segmentation processor 210, the multi-language OCR processor 212, the document generating processor 214, and the transceiver 216. The data processor 208 may be implemented based on a number of processor technologies known in the art. For example, the data processor 208 may be implemented using one or more of, but not limited to, an X86-based processor, a RISC processor, an ASIC processor, a CISC processor, and/or other such processors.

The data segmentation processor 210 comprises a suitable logic, circuitry, interfaces, and/or a code that may be configured to execute the one or more sets of instructions, programs, or algorithms stored in the memory 204 to perform the one or more operations. For instance, the data segmentation processor 210 may be configured to segment the plurality of keywords into the plurality of layers. For instance, the data segmentation processor 210 may be configured to segment the plurality of textual sub-portions into the plurality of layers. The data segmentation processor 210 may be communicatively coupled to the processor 202, the memory 204, the I/O unit 206, the data processor 208, the multi-language OCR processor 212, the document generating processor 214, and the transceiver 216. The data segmentation processor 210 may be implemented based on a number of processor technologies known in the art. For example, the data segmentation processor 210 may be implemented using one or more of, but not limited to, an X86-based processor, a RISC processor, an ASIC processor, a CISC processor, and/or other such processors.

The multi-language OCR processor 212 comprises a suitable logic, circuitry, interfaces, and/or a code that may be configured to execute the one or more sets of instructions, programs, or algorithms stored in the memory 204 to perform the one or more operations. In an embodiment, the multi-language OCR processor 212 may correspond to an OCR processor that is trained in the plurality of languages. In an embodiment, the multi-language OCR processor 212 may be configured to generate the OCR output of each of the plurality of layers based on the language associated with the one or more keywords in each of the plurality of layers. In another embodiment, the multi-language OCR processor 212 may be configured to generate the OCR output of each of the plurality of layers based on the language associated with each of the plurality of textual sub-portions, where each textual sub-portion corresponds to a layer in the plurality of layers. The multi-language OCR processor 212 may be communicatively coupled to the processor 202, the memory 204, the I/O unit 206, the data processor 208, the data segmentation processor 210, the document generating processor 214, and the transceiver 216. The multi-language OCR processor 212 may be implemented based on a number of processor technologies known in the art. For example, the multi-language OCR processor 212 may be implemented using one or more of, but not limited to, an X86-based processor, a RISC processor, an ASIC processor, a CISC processor, and/or other such processors.

The document generating processor 214 comprises a suitable logic, circuitry, interfaces, and/or a code that may be configured to execute the one or more sets of instructions, programs, or algorithms stored in the memory 204 to perform the one or more operations. For example, the document generating processor 214 may be configured to generate the electronic document of the received image based on the generated OCR output of each of the plurality of layers. The document generating processor 214 may be communicatively coupled to the processor 202, the memory 204, the I/O unit 206, the data processor 208, the data segmentation processor 210, the multi-language OCR processor 212, and the transceiver 216. The document generating processor 214 may be implemented based on a number of processor technologies known in the art. For example, the document generating processor 214 may be implemented using one or more of, but not limited to, an X86-based processor, a RISC processor, an ASIC processor, a CISC processor, and/or other such processors.

The transceiver 216 comprises a suitable logic, circuitry, interfaces, and/or a code that may be configured to receive/transmit the image and/or the electronic document from/to one or more computing devices (e.g., the user-computing device 102, the MFD 104, and the database server 106) over the communication network 110. In an embodiment, the transceiver 216 may implement one or more known technologies to support wired or wireless communication with the communication network 110. In an embodiment, the transceiver 216 may include, but is not limited to, an antenna, a radio frequency (RF) transceiver, one or more amplifiers, a tuner, one or more oscillators, a digital signal processor, a universal serial bus device, a coder-decoder (CODEC) chipset, a subscriber identity module (SIM) card, and/or a local buffer. The transceiver 216 may communicate via wireless communication with networks, such as internet, intranet, and/or a wireless network, such as a cellular telephone network, a WLAN or MAN. The wireless communication may use any of a plurality of communication standards, protocols, and technologies, such as a global system for mobile communications (GSM), enhanced data GSM evolution (EDGE), wideband code division multiple access (W-CDMA), code division multiple access (CDMA), time division multiple access (TDMA), Bluetooth, Wi-fi (e.g., IEEE 802.11a, IEEE 802.11b, IEEE 802.11g and/or IEEE 802.11n), voice over Internet Protocol (VoIP), Wi-MAX, a protocol for email, instant messaging, and/or short message service.

Figure 3:
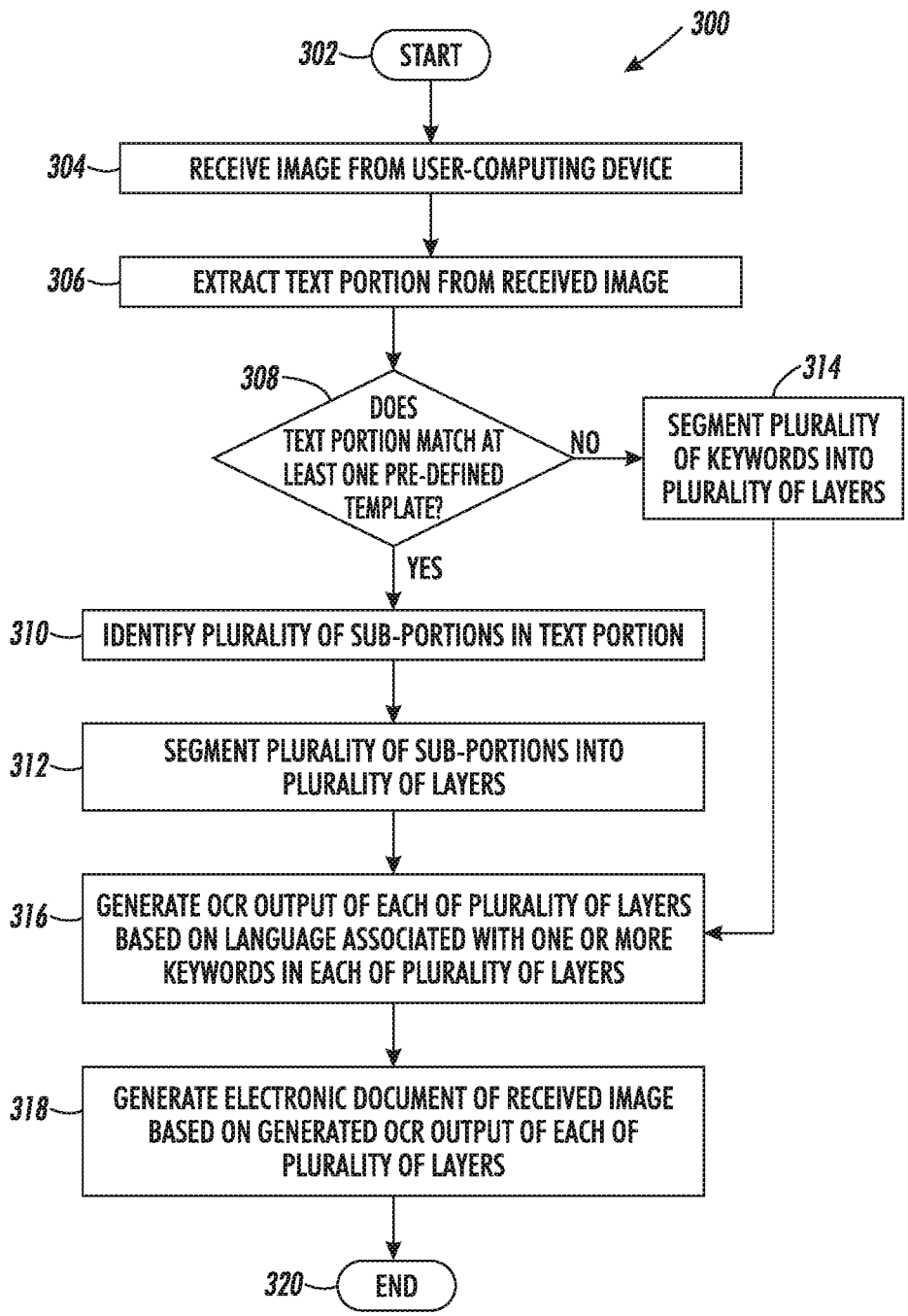
FIG. 3 is a flowchart that illustrates a method for OCR of multi-language content, in accordance with at least one embodiment.

FIG. 3 is a flowchart that illustrates a method for the OCR of multi-language content, in accordance with an embodiment. With reference to FIG. 3, there is shown a flowchart 300 that is described in conjunction with FIG. 1 and FIG. 2. The method starts at step 302 and proceeds to step 304.

At step 304, the image is received from the user-computing device 102. In an embodiment, the processor 202 may be configured to receive the image from the user-computing device 102 over the communication network 110, through the transceiver 216. Prior to the reception of the image, the processor 202, in conjunction with the transceiver 218, may be configured to receive the request, for generating the electronic document of the image, from the user-computing device 102. In an embodiment, the user may transmit the image along with the request. In an exemplary scenario, the user may utilize the user-computing device 102 to capture an image of a hard copy of a printed document. Thereafter, the user may transmit the captured image to the processor 202 for generating the electronic document of the captured image. In another exemplary scenario, the user may utilize the MFD 104 to scan a hard copy of a printed document. Thereafter, the user may transmit the scanned image to the processor 202 for generating the electronic document of the scanned image.

In another embodiment, the user may transmit a URL code of the image to the processor 202. In such a scenario, the processor 202 may utilize the URL code to retrieve the image from one or more data sources, such as the database server 106 or one or more websites, over the communication network 110.

In an embodiment, the received image may comprise a background portion and a foreground portion. In an embodiment, the foreground portion may be overlapped on the background portion of the image. Further, the foreground portion in the image may correspond to the text portion. Examples of the received image have been illustrated later as block 402 in exemplary scenario 400 of FIG. 4 and block 502 in exemplary scenario 500 of FIG. 5.

A person having ordinary skill in the art will understand that the examples of the received image are for illustrative purpose and should not be construed to limit the scope of the disclosure.

At step 306, the text portion from the received image is extracted. In an embodiment, the data processor 208, in conjunction with the processor 202, may be configured to extract the text portion from the received image. In an embodiment, the data processor 208 may utilize one or more image processing techniques known in the art for the extraction of the text portion from the received image. Examples of the one or more image processing techniques may include, but are not limited to, the edge-based text region extraction technique, the connected component-based text region extraction technique, and the wavelet-based text region extraction technique.

In an embodiment, the extracted text portion may comprise the plurality of keywords. Further, the plurality of keywords may be associated with the plurality of languages. In an embodiment, each keyword in the plurality of keywords may be associated with one or more position coordinates. The one or more position coordinates of a keyword may indicate a position of occurrence of the keyword in the received image. In an exemplary scenario, the one or more position coordinates may correspond to coordinates of corners of a bounding box encompassing the corresponding keyword in the received image. The one or more position coordinates may be determined based on a reference point or an origin point (i.e., (0, 0)). For instance, the geometric center of the received image may correspond to a reference point. For another instance, the top-most left corner of the received image may correspond to a reference point. In another exemplary scenario, the one or more position coordinates of a keyword may comprise a positional distance of the bounding box, encompassing the keyword, from one or more edges, such as left edge, top edge, and/or the like, of the received image. In another exemplary scenario, the one or more position coordinates may comprise a row number, a column number, and a count of letters in the corresponding keyword. The row number may indicate a text line to which the corresponding keyword belongs and the column number may indicate a position of a first letter of the keyword in the corresponding line. In an embodiment, the one or more position coordinates of each keyword in the plurality of keywords are retained in the extracted text portion. Examples of the extracted text portion have been illustrated later in detail as block 404B in the exemplary scenario 400 of FIG. 4 and block 504B in the exemplary scenario 500 of FIG. 5.

A person having ordinary skill in the art will understand that the examples of the extracted text portion are for illustrative purpose and should not be construed to limit the scope of the disclosure.

At step 308, a check is performed to determine whether the extracted text portion matches at least one pre-defined template of the one or more pre-defined templates. In an embodiment, the processor 202 may be configured to perform the check to determine whether the extracted text portion matches at least one pre-defined template of the one or more pre-defined templates. In an embodiment, the processor 202 may utilize one or more image processing techniques known in the art to perform the check. Before performing the check, the processor 202 may be configured to retrieve the one or more pre-defined templates from the database server 106. In an embodiment, if the processor 202 determines that the extracted text portion matches at least one pre-defined template of the one or more pre-defined templates, control passes to step 310. Else, control passes to step 314.

At step 310, the plurality of sub-portions in the text portion are identified. In an embodiment, the data processor 208 may be configured to identify the plurality of sub-portions in the text portion. In an embodiment, the data processor 208 may be configured to identify the plurality of textual sub-portions based on the one or more pre-defined rules specified by the user. Further, in an embodiment, the identification of the plurality of textual sub-portions may be based on the association of each of the plurality of textual sub-portions with a corresponding language from the plurality of languages.

Prior to the identification of the plurality of textual sub-portions, the data processor 208 may be configured to retrieve the one or more pre-defined rules associated with the pre-defined template that matched with the text portion. Thereafter, the data processor 208 may be configured to identify the plurality of textual sub-portions based on the one or more pre-defined rules. In an embodiment, the one or more pre-defined rules may comprise the definition of the plurality of textual sub-portions. The data processor 208 may be configured to utilize the definition of the plurality of textual sub-portions for the identification of the plurality of textual sub-portions. The definition of the plurality of textual sub-portions may comprise details pertaining to the one or more position identifiers of each textual sub-portion. The data processor 208 may be configured to utilize the one or more position identifiers of each of the plurality of textual sub-portions for the identification of the plurality of textual sub-portions. For example, the definition of the plurality of textual sub-portions in the pre-defined template "T1" (that matched the extracted text portion) comprises the one or more position identifiers, such as (a1,b1,c1,d1) and (a2,b2, c2,d2), of the bounding box of a first textual sub-portion and a second textual sub-portion, respectively. The data processor 208 may identify two textual sub-portions, i.e., the first textual sub-portion and the second textual sub-portion, in the extracted text content based on the one or more position identifiers such as (a1,b1,c1,d1) and (a2,b2,c2,d2). Examples of the identified first textual sub-portion and the identified second textual sub-portion in the extracted text portion have been illustrated later in detail as bounded box "SP1" and "SP2," respectively, in block 404B of the exemplary scenario 400 of FIG. 4.

A person having ordinary skill in the art will understand that the examples of the extracted text portion are for illustrative purpose and should not be construed to limit the scope of the disclosure.

In an embodiment, the data processor 208 may be configured to associate each textual sub-portion in the plurality of textual sub-portions with a language in the plurality of languages. In an embodiment, the data processor 208 may be configured to associate each textual sub-portion with a language based on the definition of each textual sub-portion in the one or more pre-defined rules. Further, each of the identified textual sub-portion may comprise the one or more keywords from the plurality of keywords in the extracted text portion. For example, the first textual sub-portion may comprise the one or more keywords, such as "scanned," "documents," "retype," and "important," and the second textual sub-portion may comprise the one or more keywords such as "отсканир ," "ованные ," "документы ," "повтор ," and "важно ." In an embodiment, the one or more keywords in each textual sub-portion are associated with a common language (i.e., the language associated with the corresponding textual sub-portion). For example, the one or more keywords, such as "scanned," "documents," "retype," and "important," in the first textual sub-portion are associated with English language and the one or more keywords, such as "отсканир," "ованные," "документы," "повтор," and "важно," in the second textual sub-portion are associated with Russian language.

A person having ordinary skill in the art will understand that the above-mentioned examples are for illustrative purpose and should not be construed to limit the scope of the disclosure.

In an embodiment, the data processor 208 may be configured to assign a language tag to each of the plurality of textual sub-portions based on an association of the corresponding textual sub-portion with a language. For example, the data processor 208 may assign a language tag, "English," to the first textual sub-portion and another language tag, such as "Russian," to the second textual sub-portion.

At step 312, the plurality of textual sub-portions are segmented into the plurality of layers. In an embodiment, the data segmentation processor 210, in conjunction with the data processor 208, may be configured to segment the plurality of textual sub-portions into the plurality of layers, when the extracted text portion matches a pre-defined template in the one or more pre-defined templates. In an embodiment, the data segmentation processor 210 may be configured to utilize one or more data segmentation techniques known in the art for the segmentation of the plurality of textual sub-portions into the plurality of layers. In an embodiment, each layer in the plurality of layers may be virtually isolated from each other. For example, the layer "L2" may be masked with respect to the layer "L1," thus making the two layers virtually isolated.

In an embodiment, when the data segmentation processor 210 segments the plurality of textual sub-portions into the plurality of layers, the one or more position coordinates of the one or more keywords in each of the plurality of textual sub-portions are retained in the corresponding layer. Further, the data processor 208 may be configured to associate each layer in the plurality of layers with a language tag same as that of the corresponding textual sub-portion. For example, the data processor 208 may assign the language tag "English" to a layer "L1" corresponding to the first textual sub-portion and the other language tag "Russian" to another layer "L2" corresponding to the second textual sub-portion.

A person having ordinary skill in the art will understand that the above-mentioned example is for illustrative purpose and should not be construed to limit the scope of the disclosure. Further, a count of layers in the plurality of layers may be equal to a count of textual sub-portions in the identified plurality of textual sub-portions.

A detailed description of the segmentation of the plurality of textual sub-portions into the plurality of layers has been illustrated later in FIG. 4.

The control passes to step 316.

At step 314, when the extracted text portion fails to match any pre-defined template, the plurality of keywords in the text portion are segmented into the plurality of layers. In an embodiment, when the processor 202 determines that the extracted text portion does not match any pre-defined template, the data segmentation processor 210, in conjunction with the processor 202, may be configured to segment the plurality of keywords into the plurality of layers.

Prior to the segmentation of the plurality of keywords into the plurality of layers, the data processor 208, in conjunction with the processor 202, may be configured to determine the one or more position coordinates associated with each of the plurality of keywords. In an embodiment, the data processor 208 may be configured to utilize one or more text localization techniques known in the art to determine the one or more position coordinates of the plurality of keywords. In an embodiment, the data processor 208 may be configured to store the one or more position coordinates of each of the plurality of keywords in the memory 204.

Thereafter, the data processor 208 may be configured to determine a language associated with each keyword in the plurality of keywords. In an embodiment, the data processor 208 may be configured to utilize one or more language detection techniques, such as segment scores, known in the art for the determination of the language, in the plurality of languages, associated with each keyword in the plurality of keywords. Thereafter, the data processor 208 may be configured to associate a language tag with each keyword in the plurality of keywords based on the determined language. For example, the data processor 208 may determine the language associated with a keyword, "scanned," is English language. Thereafter, the data processor 208 may assign a language tag, "English," with the keyword "scanned."

A person having ordinary skill in the art will understand that the above-mentioned example is for illustrative purpose and should not be construed to limit the scope of the disclosure.

Thereafter, in an embodiment, the data segmentation processor 210 may be configured to segment the plurality of keywords into the plurality of layers based on the association of the plurality of keywords with the plurality of languages. The data segmentation processor 210 may be configured to segment the one or more keywords with a same language tag in one layer of the plurality of layers. For example, the data segmentation processor 210 segments the one or more keywords with a language tag, "English," in one layer and the one or more keywords with another language tag, "Russian" in another layer.

Further, the data segmentation processor 210 may be configured to retain the one or more position coordinates of the one or more keywords in the corresponding layer. For example, keyword "scanned" with one or more position coordinates as (a3, b3, c3, d3) in the image may occupy the same position coordinates in the corresponding layer after segmentation. In other words, a layer in the plurality of layers may comprise the one or more keywords that are associated with a common language and the one or more keywords occupy the same position in the layer as in the received image. Further, in an embodiment, each layer in the plurality of layers may be virtually isolated from each other. For example, a layer "L2" may be masked with respect to a layer "L1," thus making the two layers virtually isolated.

A detailed description of the segmentation of the plurality of keywords into the plurality of layers has been illustrated later in FIG. 5.

A person having ordinary skill in the art will understand that the above-mentioned exemplary scenario is for illustrative purpose and should not be construed to limit the scope of the disclosure.

The control passes to step 316.

At step 316, the OCR output of each of the plurality of layers is generated based on the language associated with the one or more keywords in each of the plurality of layers. In an embodiment, the multi-language OCR processor 212, in conjunction with the processor 202, may be configured to generate the OCR output of each of the plurality of layers generated based on the language associated with the one or more keywords in each of the plurality of layers.

Before utilizing the multi-language OCR processor 212 to generate the OCR output of each of the plurality of layers, the data processor 208 may be configured to train an OCR processor in the plurality of languages. In an embodiment, the data processor 208 may utilize training data for each language in the plurality of languages for training the OCR processor to recognize the one or more keywords in each layer. Further, the training data associated with a language may correspond to a language dictionary of the corresponding language. In an embodiment, the trained OCR processor may correspond to the multi-language OCR processor 212.

In an embodiment, the multi-language OCR processor 212 may be configured to identify the language tag associated with each layer in the plurality of layers. Thereafter, the multi-language OCR processor 212 may be configured to utilize language settings (i.e., the language dictionary) corresponding to the identified language tag to generate the OCR output of each corresponding layer. For example, the multi-language OCR processor 212 may identify that a layer "L1" is associated with a language tag, "English." Thus, the multi-language OCR processor 212 may utilize the language dictionary associated with English language to generate the OCR output of the layer "L1." Similarly, the multi-language OCR processor 212 may be configured to generate the OCR output of the other layers in the plurality of layers.

In an embodiment, the multi-language OCR processor 212 may be configured to process the plurality of layers in a sequence (i.e., one after the other) for generating OCR outputs. In another embodiment, the multi-language OCR processor 212 may be configured to process the plurality of layers in parallel (i.e., all at the same time) to generate the OCR output.

In an embodiment, the multi-language OCR processor 212 may be configured to retain the one or more position coordinates of the one or more keywords in the generated OCR output. For example, keyword "scanned" with one or more position coordinates as (a3, b3, c3, d3) in the layer may occupy the same position coordinates in the corresponding OCR output.

A person having ordinary skill in the art will understand that the above-mentioned example is for illustrative purpose and should not be construed to limit the scope of the disclosure.

At step 318, the electronic document of the received image is generated based on the generated OCR output of each of the plurality of layers. In an embodiment, the document generating processor 214, in conjunction with the processor 202, may be configured to generate the electronic document of the received image based on the generated OCR output of each of the plurality of layers.

For generating the electronic document of the received image, the document generating processor 214 may be configured to embed the generated OCR output of each of the plurality of layers on the background portion of the image. In other words, the document generating processor 214 may be configured to superimpose the generated OCR output of each of the plurality of layers on the background portion of the image as searchable layers such that the plurality of keywords in the electronic document can be selected by the user.

Further, the one or more position coordinates of each of the plurality of keywords in the electronic document are retained. In other words, each keyword occupies the same position in the generated electronic document as in the received image. In an embodiment, the position of the plurality of keywords may be determined based on the reference point or the origin point.

After the generation of the electronic document, the processor 202, in conjunction with the transceiver 216, may be configured to transmit the generated electronic document to the user-computing device 102, over the communication network 110. Further, the user may utilize the user-computing device 102 to perform one or more operations, such as editing, selecting, and/or the like, on the text content in the received electronic document. In another embodiment, the processor 202 may be configured to store the generated electronic document in the database server 106.

The control passes to end step 320.

Figure 4:
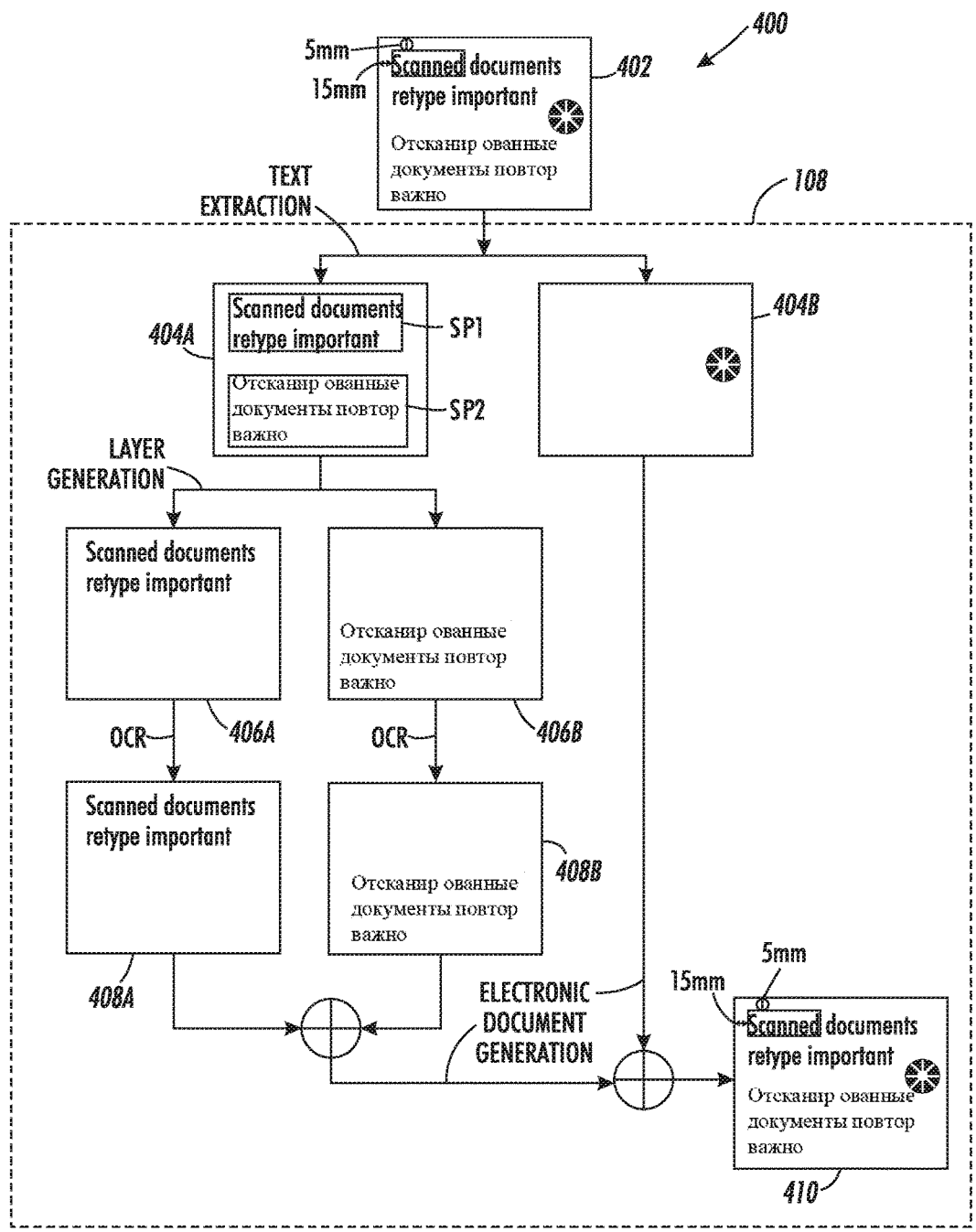
FIG. 4 is a block diagram that illustrates an exemplary scenario for OCR of multi-language content with a pre-defined template, in accordance with at least one embodiment.

FIG. 4 is a block diagram that illustrates an exemplary scenario for OCR of multi-language content with a pre-defined template, in accordance with at least one embodiment. FIG. 4 has been described in conjunction with FIGS. 1-3.

With reference to FIG. 4, there is shown an exemplary scenario 400 that illustrates an image 402 received by the application server 108. The image 402 may comprise a foreground portion (i.e., a text portion) overlapped on a background portion. The application server 108 may be configured to extract text portion 404A from the image 402. The application server 108 may be further configured to identify the remaining background portion of the image 402 represented by a block 404B. The extracted text portion 404A may correspond to a pre-defined template.

The application server 108 may be configured to compare the extracted text portion 404A with one or more pre-defined templates. Thereafter, the application server 108 may identify the plurality of textual sub-portions based on the one or more pre-defined rules associated with a matching pre-defined template. The application server 108 may identify a first textual sub-portion (encompassed by a bounded box "SP1") and a second textual sub-portion (encompassed by another bounded box "SP2") based on the one or more pre-defined rules. The first textual sub-portion comprises one or more keywords such as "scanned," "documents," "retype," and "important." The second textual sub-portion comprises one or more keywords such as "отсканир," "ованные," "документы," "повтор," and "важно." Based on the one or more pre-defined rules, the application server 108 may identify that the first textual sub-portion is associated with "English" language and the second textual sub-portion is associated with "Russian" language. Further, the application server 108 may segment the plurality of textual sub-portions into a plurality of layers such as a first layer 406A and a second layer 406B. The first layer 406A comprises the first textual sub-portion encompassed by the bounded box "SP1" and the second layer 406B comprises the second textual sub-portion encompassed by the bounded box "SP2." The position of the first textual sub-portion in the first layer 406A is same as that in the extracted text portion 404A. The position of the second textual sub-portion in the second layer 406B is same as that in the extracted text portion 404A. Further, the application server 108 may associate the first layer 406A with the same language (i.e., "English" language) as associated with the first textual sub-portion and the second layer 406B with the same language (i.e., "Russian" language) as associated with the second textual sub-portion.

Further, the application server 108 may generate a first OCR output 408A of the first layer 406A and a second OCR output 408B of the second layer 406B. The application server 108 may utilize "English" language settings for generating the first OCR output 408A based on the association of the first layer 406A with "English" language. The application server 108 may utilize "Russian" language settings for generating the second OCR output 408B based on the association of the second layer 406B with "Russian" language.

Thereafter, the application server 108 may generate the electronic document 410 by utilizing the first OCR output 408A, the second OCR output 408B, and the remaining background portion, represented as the block 404B. In other words, application server 108 may embed the first OCR output 408A and the second OCR output 408B, on the remaining background portion (represented as the block 404B) to generate the electronic document 410. Further, the one or more position coordinates of the plurality of keywords in the electronic document 410 are retained. For example, as illustrated, keyword "scanned" is at a positional distance of "15 mm" from the left edge of the image 402 and at a positional distance of "5 mm" from the top edge of the image 402. The one or more position coordinates of the keyword "scanned" are retained in the electronic document 410 as it occurs at the same positional distance of "15 mm" from the left edge and "5 mm" from the top edge of the electronic document 410.

A person having ordinary skill in the art will understand that the above-mentioned exemplary scenario is for illustrative purpose and should not be construed to limit the scope of the disclosure.

Figure 5:
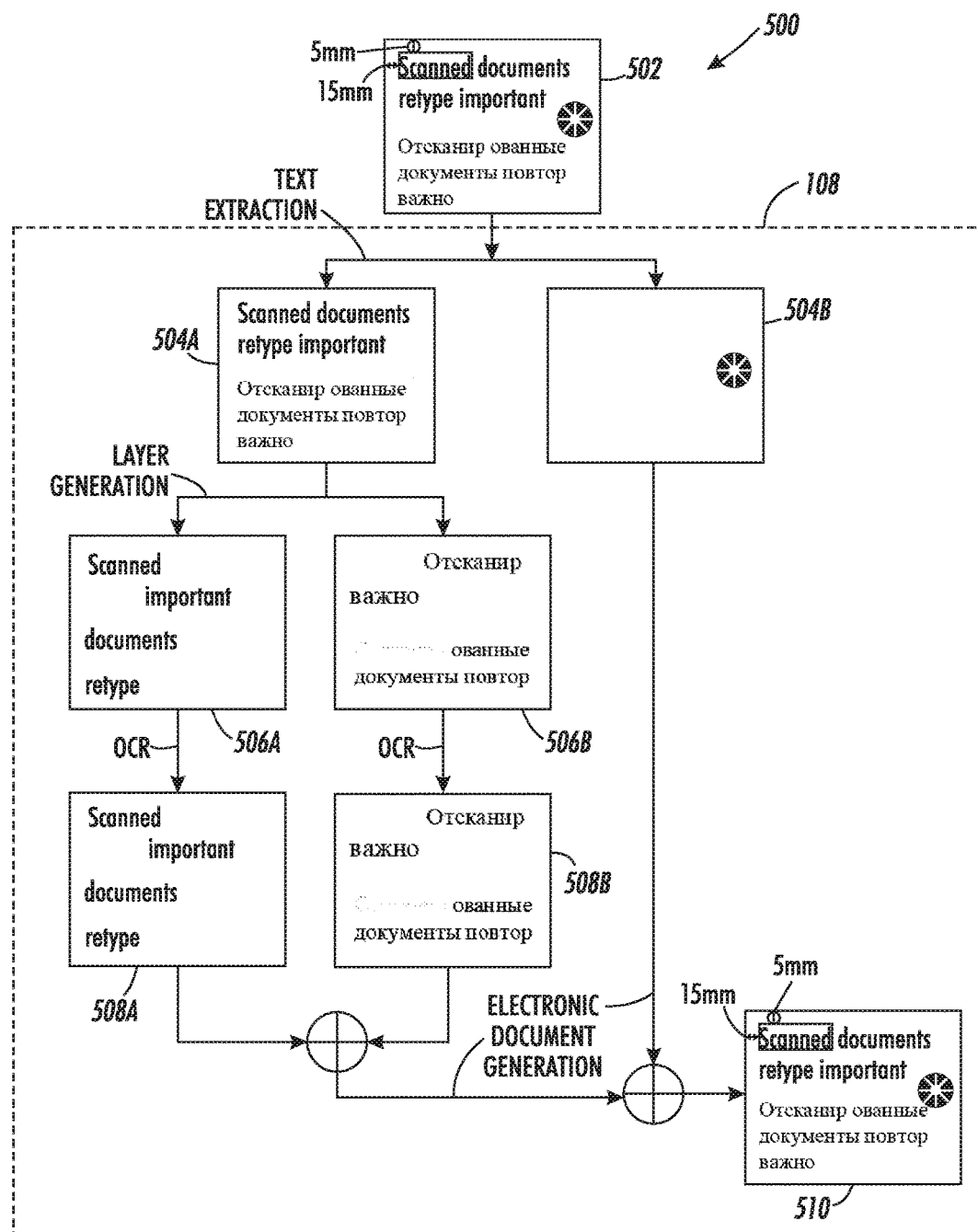
FIG. 5 is a block diagram that illustrates an exemplary scenario for OCR of multi-language content without a pre-defined template, in accordance with at least one embodiment.

FIG. 5 is a block diagram that illustrates an exemplary scenario for OCR of multi-language content without a pre-defined template, in accordance with at least one embodiment. FIG. 5 has been described in conjunction with FIGS. 1-3.

With reference to FIG. 5, there is shown an exemplary scenario 500 that illustrates an image 502 received by the application server 108. The image 402 may comprise a foreground portion (i.e., a text portion) overlapped on a background portion. The application server 108 may be configured to extract text portion 504A from the image 502. The application server 108 may be further configured to identify the remaining background portion of the image 502 represented by a block 504B. The extracted text portion 504A may not correspond to any pre-defined template. Further, the extracted text portion 504A may comprise a plurality of keywords such as "scanned," "отсканир," "важно," "important," "documents," "ованные," "документы," "повтор," and "retype."

Thereafter, the application server 108 may determine the one or more position coordinates of each of the plurality of keywords. Further, the application server 108 may determine a language associated with each of the plurality of keywords. Thereafter, the application server 108 may segment the plurality of keywords into a plurality of layers, such as a first layer 506A and a second layer 506B, based on the association of the plurality of keywords with the plurality of languages. The first layer 506A comprises one or more keywords, from the plurality of keywords, associated with the same language "English" language. The second layer 506B comprises one or more keywords, from the plurality of keywords, associated with the same language "Russian" language. Further, the one or more position coordinates of each keyword in the corresponding layer is same as that in the extracted text portion 504A. Further, the application server 108 may associate the first layer 506A with the same language (i.e., "English" language) as associated with the one or more keywords in the first layer 506A and the second layer 506B with the same language (i.e., "Russian" language) as associated with the one or more keywords in the second layer 506B.

Further, the application server 108 may generate a first OCR output 508A of the first layer 506A and a second OCR output 508B of the second layer 506B. The application server 108 may utilize "English" language settings for generating the first OCR output 508A based on the association of the first layer 506A with "English" language. The application server 108 may utilize "Russian" language settings for generating the second OCR output 508B based on the association of the second layer 506B with "Russian" language.

Thereafter, the application server 108 may generate the electronic document 510 by utilizing the first OCR output 508A, the second OCR output 508B, and the remaining background portion, represented as the block 504B. In other words, the application server 108 may embed the first OCR output 508A and the second OCR output 508B in the remaining background portion (represented as the block 504B) to generate the electronic document 510. Further, the one or more position coordinates of the plurality of keywords in the electronic document 510 are retained. As illustrated, keyword "scanned" is at a positional distance of "15 mm" from the left edge of the image 502 and at a positional distance of "5 mm" from the top edge of the image 502. The one or more position coordinates of the keyword "scanned" are retained in the electronic document 510 as it occurs at the same positional distance of "15 mm" from the left edge and "5 mm" from the top edge of the electronic document 510.

A person having ordinary skill in the art will understand that the above-mentioned exemplary scenario is for illustrative purpose and should not be construed to limit the scope of the disclosure.

Figure 6:
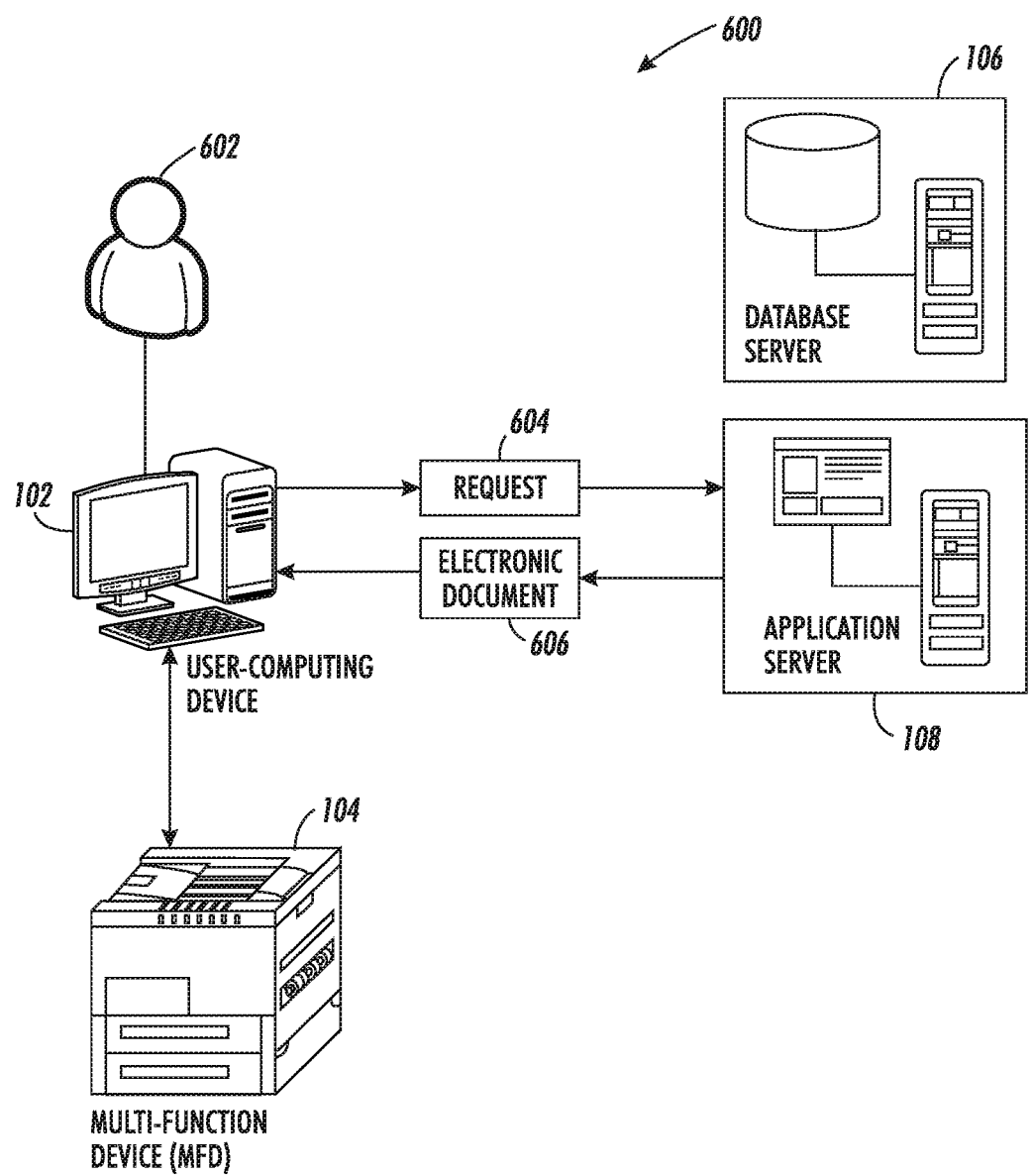
FIG. 6 is a block diagram that illustrates an exemplary system diagram for OCR of multi-language content, in accordance with at least one embodiment.

FIG. 6 is a block diagram that illustrates an exemplary system for OCR of multi-language content, in accordance with at least one embodiment. FIG. 6 has been described in conjunction with FIGS. 1-3.

reference to FIG. 6, there is shown an exemplary system diagram 600 illustrating a user 602 associated with the user-computing device 102. The user 602 may utilize the MFD 104 to scan a hard copy of a printed document. Further, the scanned image of the printed document may comprise text content in an image format, which may not be editable, selectable, or searchable, by the user. Thereafter, by utilizing the user-computing device 102, the user 602 may transmit a request 604 for generating an electronic document of the scanned image to the application server 108. After receiving the request 604, the application server 108 may process the scanned image by executing the steps 302 to 320, as illustrated in the flowchart 300 of FIG. 3, for generating the electronic document 606.

Thereafter, the application server 108 may transmit the generated electronic document 606 to the user-computing device 102. The electronic document 606 comprises the text content in machine code, such that the user may be able to perform one or more operations, such as editing, selecting, searching, and/or the like, on the text content in the received electronic document 606.

A person having ordinary skill in the art will understand that the above-mentioned exemplary scenario is for illustrative purpose and should not be construed to limit the scope of the disclosure.

Various embodiments of the disclosure encompass numerous advantages, including a method and system for the OCR of multi-language content. The disclosed method may be utilized to segment a plurality of keywords in text content of an image into a plurality of layers based on an association of the plurality of keywords with a plurality of languages. Further, the disclosed method may be utilized to generate OCR output of each layer in the plurality of layers based on the language associated with the corresponding layer. In other words, the disclosed method may be utilized to recognize multiple language text content in the image by segmenting the text content into multiple layers each comprising text content associated with a specific language. Further, the disclosed method provides flexibility to a user to provide one or more rules for defining a plurality of textual sub-portions, when the text content corresponds to a pre-defined template. Further, when the user does not want the OCR to be performed on a specific part of text content, the user may not include the specific part of text content in definition of any of the plurality of textual sub-portions. The disclosed method may further provide an interactive user interface to the user for defining the one or more rules for identifying the plurality of textual sub-portions. Further, the disclosed method may be utilized to generate a single electronic document by embedding the OCR output of each layer. The electronic document comprises accurately recognized text content of multiple languages, which may be utilized for search, copy-paste and reference. Thus, the disclosed method provides a fast, accurate, and reliable technique for managing multi-language documents for OCR. The disclosed method may be incorporated in existing software codes (or algorithms) or implemented on various existing devices for performing OCR of multiple language documents such as invoice documents, legal documents, forms, and/or the like. Thus, increasing the usage of scanned documents.

The disclosed method and system, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The system and method described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above method and system, or the numerous possible variations thereof.

Various embodiments of the method and system for OCR of multi-language content. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person having ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for optical character recognition (OCR) of multi-language content, the method comprising:
    extracting, by a data processor in a computing device, at least a text portion from an image received from a user-computing device associated with a user, over a communication network, wherein the text portion comprises a plurality of keywords associated with a plurality of languages;
    segmenting, by a data segmentation processor in the computing device, the plurality of keywords into a plurality of isolated virtual layers, wherein each isolated virtual layer of the plurality of isolated virtual layers comprises one or more keywords, from the plurality of keywords, the one or more keywords in each layer are associated with a specific language from the plurality of languages, the specific language corresponds to a common language for the one or more keywords in a given isolated virtual layer, and the given isolated layer is dedicated to the common, specific language;
    generating, by a multi-language OCR processor in the computing device, an OCR output of each of the plurality of isolated virtual layers based on the language associated with the one or more keywords in each of the plurality of isolated virtual layers;
    generating, by a document generating processor in the computing device, an electronic document corresponding to the received image based on the OCR output of each of the plurality of isolated virtual layers, wherein the electronic document comprises a background portion comprising the OCR output and a foreground portion comprising the text portion, and the OCR output in the background portion comprises searchable layers corresponding to the plurality of layers, enabling the user to perform one or more operations; and
    transmitting the electronic document to the user-computing device, over the communication network.

2. The method of claim 1 further comprising identifying, by the data processor in the computing device, a plurality of sub-portions in the text portion based on an association of each of the plurality of sub-portions with the specific language from the plurality of languages, wherein each sub-portion in the plurality of sub-portions corresponds to the given isolated virtual layer in the plurality of isolated virtual layers.

3. The method of claim 1 further comprising determining, by the data processor in the computing device, the specific language associated with each keyword in the plurality of keywords.

4. The method of claim 1, wherein each keyword in the plurality of keywords is associated with one or more position coordinates in the image.

5. The method of claim 4, wherein the one or more position coordinates of each keyword are retained in the electronic document.

6. The method of claim 1, wherein the user-computing device is a multi-function device (MFD).

7. The method of claim 1 further comprising training, by the data processor in the computing device, an OCR processor in the plurality of languages, wherein the trained OCR processor corresponds to the multi-language OCR processor.

8. A system for optical character recognition (OCR) of multi-language content, the system comprising:
    a transceiver configured to receive from a user-computing device associated with a user over a communication network;
    a data processor in a computing device configured to extract at least a text portion from the received image, wherein the text portion comprises a plurality of keywords associated with a plurality of languages;
    a data segmentation processor in the computing device configured to segment the plurality of keywords into a plurality of isolated virtual layers, wherein each isolated virtual layer of the plurality of isolated virtual layers comprises one or more keywords, from the plurality of keywords, the one or more keywords in each layer are associated with a specific language from the plurality of languages, the specific language corresponds to a common language for the one or more keywords in a given isolated virtual layer, and the given isolated layer is dedicated to the common, specific language;
    a multi-language OCR processor in the computing device configured to generate an OCR output of each of the plurality of isolated virtual layers based on the language associated with the one or more keywords in each of the plurality of isolated virtual layers; and
    a document generating processor in the computing device configured to generate an electronic document corresponding to the received image based on the OCR output of each of the plurality of isolated virtual layers, wherein the electronic document comprises a background portion comprising the OCR output and a foreground portion comprising the text portion, the OCR output in the background portion comprises searchable layers corresponding to the plurality of layers, enabling the user to perform one or more operations, and the transceiver is further configured to transmit the electronic document to the user-computing device, over the communication network.

9. The system of claim 8, wherein the user-computing device is a multi-function device (MFD).

10. The system of claim 8, wherein the data processor in the computing device is further configured to identify a plurality of sub-portions in the text portion based on an association of each of the plurality of sub-portions with the specific language from the plurality of languages, wherein each sub-portion in the plurality of sub-portions corresponds to the given isolated virtual layer in the plurality of isolated virtual layers.

11. The system of claim 8, wherein the data processor in the computing device is further configured to determine the specific language associated with each keyword in the plurality of keywords.

12. The system of claim 8, wherein the data processor in the computing device is further configured to train an OCR processor in the plurality of languages, wherein the trained OCR processor corresponds to the multi-language OCR processor.

13. The system of claim 8, wherein each keyword in the plurality of keywords is associated with one or more position coordinates in the image, wherein the one or more position coordinates of each keyword are retained in the electronic document.

14. A computer program product for use with a computer, the computer program product comprising a non-transitory computer readable medium, wherein the non-transitory computer readable medium stores a computer program code for optical character recognition (OCR) of multi-language content, wherein the computer program code is executable by one or more processors in a computing device to:

extract at least a text portion from an image received from a user-computing device associated with a user, over a communication network, wherein the text portion comprises a plurality of keywords associated with a plurality of languages;

segment the plurality of keywords into a plurality of isolated virtual layers, wherein each isolated virtual layer of the plurality of isolated virtual layers comprises one or more keywords, from the plurality of keywords, the one or more keywords in each layer are associated with a specific language from the plurality of languages, the specific language corresponds to a common language for the one or more keywords in a given isolated virtual layer, and the given isolated layer is dedicated to the common, specific language;

generate an OCR output of each of the plurality of isolated virtual layers based on the language associated with the one or more keywords in each of the plurality of isolated virtual layers;

generate an electronic document corresponding to the received image based on the generated OCR output of each of the plurality of isolated virtual layers, wherein the electronic document comprises a background portion comprising the OCR output and a foreground portion comprising the text portion, and the OCR output in the background portion comprises searchable layers corresponding to the plurality of layers, enabling the user to perform one or more operations; and transmit the electronic document to the user-computing device, over the communication network.

15. The method of claim 1, further comprising performing a check to determine if the extracted text portion matches at least one pre-defined template.

16. The method of claim 1, wherein the one or more operations comprise searching and one or more of selecting, copying, pasting, and editing of the one or more keywords in the text portion.

17. The system of claim 8, wherein the one or more operations comprise searching and one or more of selecting, copying, pasting, and editing of the one or more keywords in the text portion.

18. The computer program product of claim 14, wherein the one or more operations comprise searching and one or more of selecting, copying, pasting, and editing of the one or more keywords in the text portion.

* * * * *